United States Patent
Deleuze (10) Patent No.: US 10,755,130 B2
(45) Date of Patent: Aug. 25, 2020

(54) IMAGE COMPRESSION BASED ON TEXTUAL IMAGE CONTENT

(71) Applicant: International Business Machines Corporation, Armonk, NY (US)

(72) Inventor: Ivan Deleuze, Montpellier (FR)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/008,199

(22) Filed: Jun. 14, 2018

(65) Prior Publication Data

US 2019/0385000 A1    Dec. 19, 2019

(51) Int. Cl.
G06K 9/34     (2006.01)
G06T 9/00     (2006.01)

(52) U.S. Cl.
CPC .............. G06K 9/344 (2013.01); G06T 9/00 (2013.01); G06K 2209/01 (2013.01)

(58) Field of Classification Search
CPC ....... G06K 9/344; G06K 2209/01; G06T 9/00
See application file for complete search history.

(56) References Cited

U.S. PATENT DOCUMENTS

| 5,109,433 | A  | * | 4/1992  | Notenboom | G06T 9/005 |
|           |    |   |         |           | 382/240    |
| 9,202,142 | B1 | * | 12/2015 | Conboy    | G06K 9/6267 |
| 2002/0027675 | A1 | * | 3/2002 | Minato | H04N 1/00214 |
|           |    |   |         |           | 358/1.15   |
| 2007/0022217 | A1 | * | 1/2007 | Ayres, Jr. | H04N 21/23418 |
|           |    |   |         |           | 709/247    |
| 2007/0269139 | A1 | * | 11/2007 | Erol | G06K 9/00442 |
|           |    |   |         |           | 382/305    |
| 2008/0086700 | A1 | * | 4/2008 | Rodriguez | G06F 9/451 |
|           |    |   |         |           | 715/804    |
| 2009/0129693 | A1 | * | 5/2009 | Bloebaum | H04N 5/225 |
|           |    |   |         |           | 382/255    |
| 2010/0150460 | A1 | * | 6/2010 | Fan | G06K 9/72 |
|           |    |   |         |           | 382/232    |

(Continued)

OTHER PUBLICATIONS

Ding, et al., "Rate-Distortion Optimized Color Quantization for Compound Image Compression", Visual Communications and Image Processing 2007, SPIE-IA&T/ vol. 6508, 9 pages.

(Continued)

*Primary Examiner* — Ming Y Hon
(74) *Attorney, Agent, or Firm* — Robert J. Shatto (57) ABSTRACT

An original image containing a string of text is received. The string of text contained in the original image is determined using text recognition. A first compression level applied to the original image creates a first compressed image. A string of text contained in the first compressed image is determined using text recognition. The string of text contained in the original image is compared with the string of text contained in the first compressed image. The first compression level is incremented to reach a second compression level. The second compression level applied to the original image creates a second compressed image. A string of text contained in the second compressed is determined image using text recognition. The string of text contained in the original image is compared with the string of text contained in the second compressed image. It is determined that further image compression refinement is unnecessary.

17 Claims, 5 Drawing Sheets

(56) References Cited

U.S. PATENT DOCUMENTS

| | | | |
|---|---|---|---|
| 2014/0212057 A1* | 7/2014 | Konnola | G06T 9/00 |
| | | | 382/232 |
| 2014/0225928 A1 | 8/2014 | Konnola | |
| 2014/0283113 A1* | 9/2014 | Hanna | G06F 21/32 |
| | | | 726/27 |
| 2017/0201571 A1* | 7/2017 | Sherf | H04N 21/00 |
| 2018/0157906 A1* | 6/2018 | Loginov | G06K 9/00442 |

OTHER PUBLICATIONS

Maheswari, et al., "Comparison of Layer and Block Based Classification in Compound Image Compression", International Journal of Computer Science and Information Technologies, vol. 2(2), 2011, pp. 888-890.

Mell et al., "The NIST Definition of Cloud Computing", National Institute of Standards and Technology, Special Publication 800-145, Sep. 2011, 7 pages.

* cited by examiner

IMAGE COMPRESSION BASED ON TEXTUAL IMAGE CONTENT

BACKGROUND

Increasingly, individuals and entities can store large quantities of images. Various techniques exist for compressing images to conserve storage space, whether on hard drives or other storage media. Image compression techniques include methods for compressing images as far as possible without losing any data and methods for compressing images with acceptable levels of data loss. Often methods for compressing images are applied in a systematic fashion, such as compressing all images to 85% of original size, without regard to the content of the images.

SUMMARY

Disclosed herein are embodiments of a method, system, and computer program product for compressing a text-containing image while maintaining text readability. An original image containing a string of text is received. The string of text contained in the original image is determined using text recognition. A first compression level is applied to the original image to create a first compressed image. A string of text contained in the first compressed image is determined using text recognition. The string of text contained in the original image is compared with the string of text contained in the first compressed image. Based on results of the comparison of the string of text contained in the original image with the string of text contained in the first compressed image, the first compression level is incremented using a first compression increment value to reach a second compression level. The second compression level is applied to the original image to create a second compressed image. A string of text contained in the second compressed is determined image using text recognition. The string of text contained in the original image is compared with the string of text contained in the second compressed image. Based on results of the comparison of the string of text contained in the original image with the string of text contained in the second compressed image, it is determined that further image compression refinement using the first compression increment value is unnecessary.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to image compression, and more specifically, to iterative compression of images based on textual image content. While the present disclosure is not necessarily limited to such applications, various aspects of the disclosure can be appreciated through a discussion of various examples using this context.

When compressing an image using standard techniques, images are often compressed without regard to whether the image is of a landscape, a portrait, text, or any other type of content. However, when viewing non-text images (for example, landscape images) a higher level of image compression may be acceptable due to a viewer's retained ability to understand the compressed image compared to the original. Image compression of non-text images can result in an approximately linear amount of loss of value (i.e. an image which is further compressed may become blurrier or result in image artifacts progressively as the image is compressed further). In contrast, an image containing text may not be able to be compressed as far without the text becoming illegible. Additionally, when an image containing text is compressed to the point the text becomes illegible, the image can lose all (or a substantial portion) of its value abruptly. However, until the point of illegibility, compression of a text-containing image can similarly proceed with an approximately linear amount of loss of value (i.e. the text may become blurrier or otherwise harder to read while remaining legible).

Embodiments of the present disclosure include an image compression application. The image compression application can receive an original image containing text. The original image can be analyzed to determine the text contained within the image. The image compression application can determine an initial compression level to attempt and first compression increments with which to adjust the compression level. A compression level can be applied to the original image using image compression techniques. The image compression application can analyze the compressed image to determine the text contained within the compressed image and compare this text with the text in the original image. Based on this comparison, the image compression application can determine if refinement of the compression level is needed. In embodiments with a high starting compression level, this could occur if the image was compressed too far and in embodiments with a low starting compression level, this could occur if the image was not compressed enough. If refinement is needed, the image compression application can increment the compression level, apply the new compression level, and analyze the new compressed image. Once it is determined refinement is not needed, the image compression application can finalize the compressed image.

Compared to known solutions, this disclosure provides benefits including that images containing text can be compressed to a level such that the text within the image remains readable while compressing to an appropriate degree. This can balance the competing interests of image file size with image quality. The embodiments described herein enable a system to more efficiently use resources, such as memory storage space and bandwidth used to transmit images containing text by compressing the images, while also enabling the system to preserve legible text in the images. These improvements and/or advantages are a non-exhaustive list of example advantages. Embodiments of the present disclosure exist which can contain none, some, or all of the aforementioned advantages and/or improvements.

Figure 1:
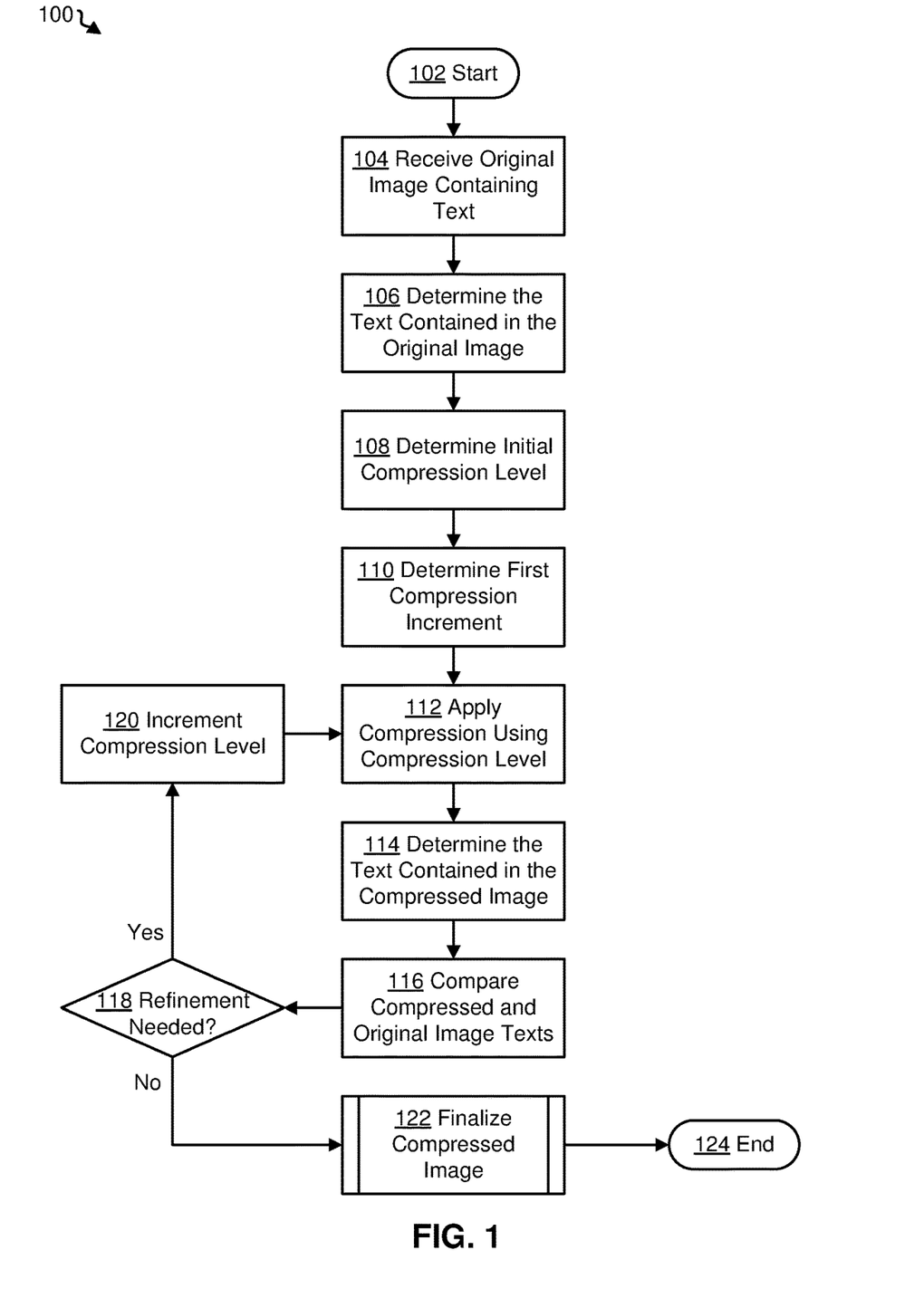
FIG. 1 depicts an example method for compressing a text-containing image while maintaining text readability, in accordance with embodiments of the present disclosure.
Figure 4:
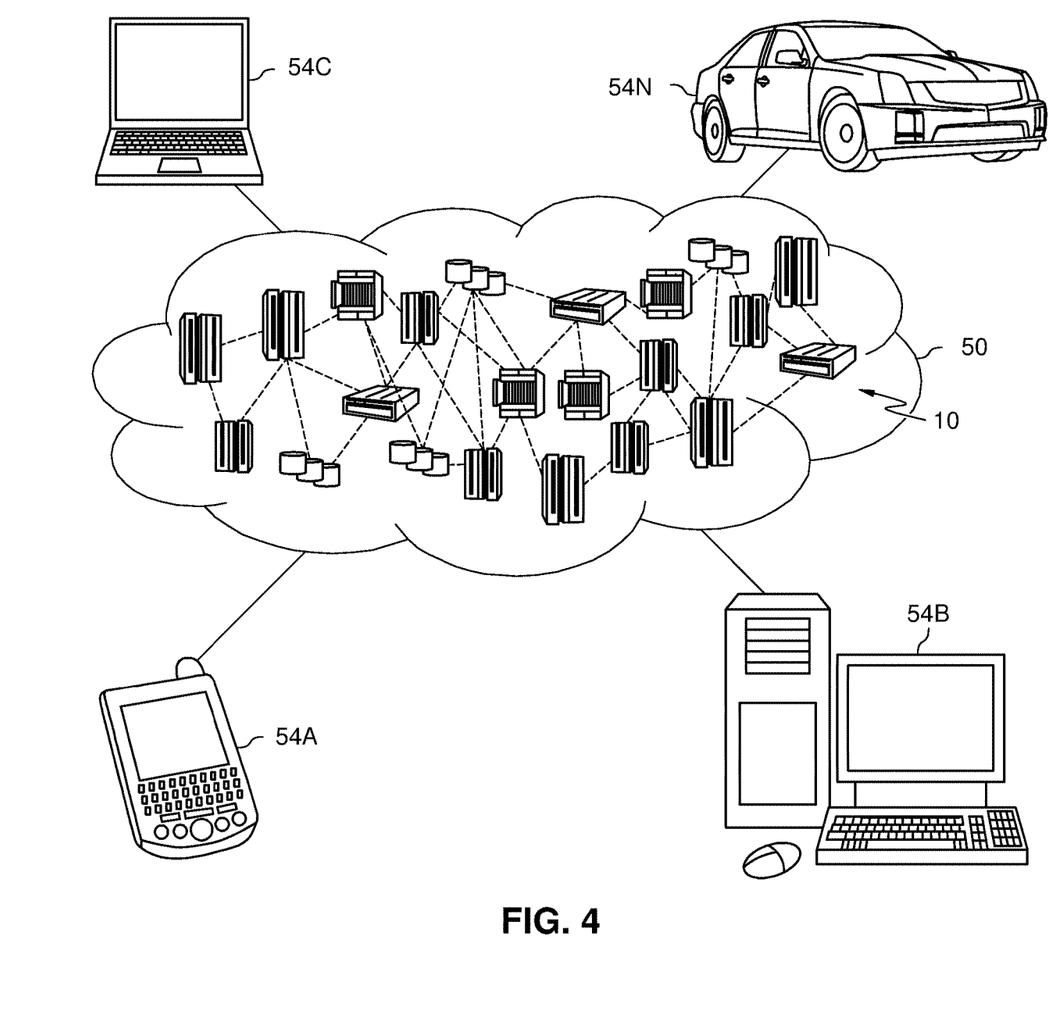
FIG. 4 depicts a cloud computing environment according to an embodiment of the present disclosure.
Figure 5:
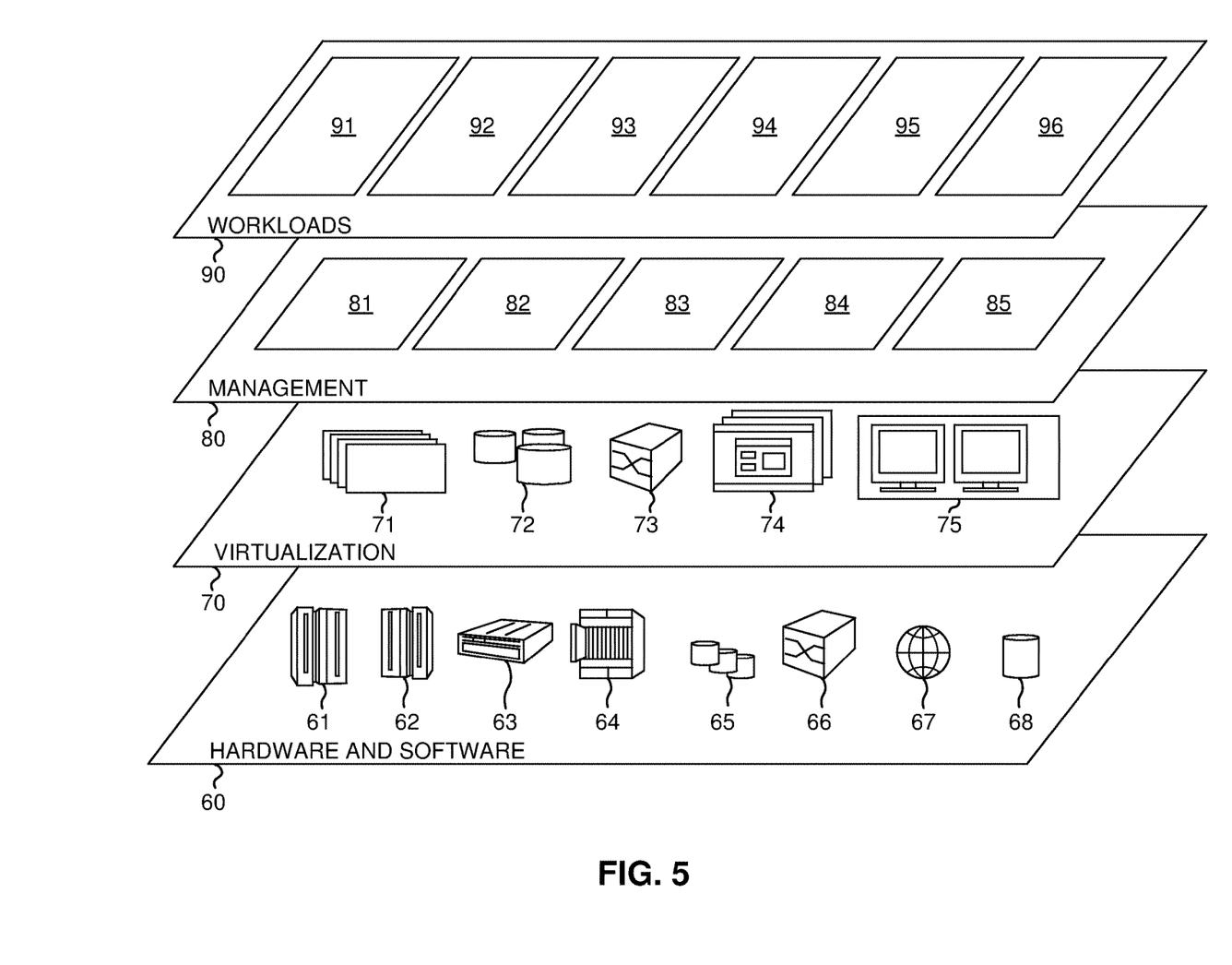
FIG. 5 depicts abstraction model layers according to an embodiment of the present disclosure.

Referring now to FIG. 1, depicted is an example method 100 for compressing a text-containing image while maintaining text readability, in accordance with embodiments of the present disclosure. Method 100 can include more or fewer actions than those depicted. Method 100 can include actions in different orders than those depicted. In some embodiments, method 100 can be performed using a user device (such as user device 300 depicted in FIG. 3) running an image compression application. In some embodiments, method 100 can be performed by one or more devices operated by an image compression service using an image compression application, including by devices utilizing cloud computing technology (such as depicted in FIGS. 4 and 5). In some embodiments method 100 can be implemented using hardware devices instead of, or in addition to, an application. In the following discussion, method 100 will be described as being performed by an image compression application, but the present disclosure is not limited to such.

From start 102, the image compression application receives an original image containing text at 104. An image compression application may receive more than one image at once, and in some embodiments, may perform method 100 simultaneously or sequentially for each such image received. In some embodiments, a user may provide more than one image to the image compression application and have the image compression application perform method 100 on one of them and apply the same compression level to the remaining images. This could occur in situations where all of the provided images are similar or of similar quality such that a similar final compression level could be sufficient for all images. An image compression application may also receive images which do not contain text. In some embodiments, the image compression application can perform an initial analysis to determine if the image contains text. In some embodiments, a user can select images which contain text to input into the image compression application.

At 106, the image compression application determines the content of the text contained in the original image. This can be performed using Optical Character Recognition (OCR) or various conventional methods used for recognizing text. In embodiments where the image compression application receives images without regard to whether they contain text and an analysis is performed to determine if the image contains text, this operation could be combined with operation 104. Any images which do not contain text, or which do not contain text recognizable by the image compression application can be discarded or compressed using a technique other than method 100. The image compression application can perform operation 106 by incorporating another program or function to determine the contents of the text contained in the original image. The determined contents can be saved, such as by storing the text in a variable named Text_original (or any other named variable or using any other means for saving text). For example, operation 106 can be performed on an image of a road with a street sign and determine the image contains the text "Highway 52 North." As a second example, operation 106 can be performed on an image of a T-shirt with printed text and determine the image contains the text "Lifeguard."

In some embodiments, the text contained within the image can refer to simply alphanumeric characters. In other embodiments, the image compression application can determine additional symbols such as ampersand (&), percent, (%), etc. In some embodiments, the image compression application can determine symbols such as emoticons or emojis.

In some embodiments, the image compression application may use a threshold number of characters of text or words of text, such that method 100 will be performed only if the threshold is reached or exceeded. This could prevent running multiple image compression iterations on images with a small amount of text which could indicate the text is not the focus of the image. In some embodiments, a user could override such a threshold and use the image compression application to perform method 100 on an image with an amount of text below the threshold number.

At 108, the image compression application determines the initial compression level to apply. Various image compression techniques apply a compression level to an image on a scale from 0 to 100, with 0 corresponding to an extremely compressed image and 100 corresponding to an image without any compression. A scale from 0 to 100 can refer to, but need not necessarily refer to, the compressed image's file size as a percentage of the original file size. Alternative techniques use different ranges, such as 1 to 12. Non-numerical compression levels can exist in embodiments, such as where compression levels are designated by words like "low," "medium," and "high." The image compression application can use any of the conventional image compression techniques and the determination of an initial compression level to apply can depend on the scale or other identifier of levels of compression. In an embodiment where the compression levels range from 0 to 100, an initial compression level can be chosen within this range, inclusive of the endpoints, such as an initial compression level of 50.

The initial compression level for one or more original images can be determined by a user of the image compression application or be determined dynamically based upon one or more characteristics of the original image. For example, a larger or higher resolution original image may be capable of further compression than a smaller or lower resolution image. Thus, in some embodiments using numerical compression levels in which the smaller the number the more the compression, the image compression application could start with a lower initial compression level for larger or higher resolution original images and with a higher initial compression level for smaller or lower resolution original images. In some embodiments, the image compression application can use a default initial compression level (whether 0, 50, or any other number) unless adjusted by a user.

In some embodiments, method 100 can be used starting with a low initial compression level number and in the event this results in an image which is too compressed, increment the compression level number upwards such that later attempts yield less compressed images. In other embodiments, method 100 can be used starting with a high initial compression level (including a value like 100 indicating no compression), and increment the compression level number downwards such that later attempts yield more compressed images.

At 110, the image compression application determines a first compression increment value. The first compression increment value can be used when the first attempt at compressing an image does not result in a final image (e.g., the resulting image is too compressed for the text to be readable) and the compression level can be incremented upwards or downwards (such as with a negative first compression increment value) to a new compression level. In an embodiment with compression levels ranging from 0 to 100, an example first compression increment value can be 10. In an example with an initial compression level of 50 and a first compression increment value of 10, after the image compression application attempts compression at 50, it can attempt compression at 60, then 70, etc. In an embodiment with compression levels ranging from 1 to 12, an example first compression increment value can be 1, such that the compression levels change by 1 each time they are incremented.

In some embodiments, a user of the image compression application can determine the first compression increment value for one or more original images. A smaller first compression increment value can result in the image compression application attempting image compression more times before it reaches a final compression level, and thus taking additional time and/or computing resources, but can reach a more precise level of compression. In some embodiments, the image compression application can determine the first compression increment value for one or more original images dynamically based upon the available computing resources, selecting a smaller value when there are ample resources available, and selecting a higher value when there are fewer resources available, such as when many other processes are running concurrently. In some embodiments, the image compression application can use a default first compression increment value (whether 1, 10, or any other number) unless adjusted by a user.

Using the initial compression level and first compression increment value, a formula of $C=X+Y*I$ can be derived and used by the image compression application. In this formula, C is the compression level to apply, X is the initial compression level, Y is the number of increments, and I is the first compression increment value. Using this formula, each time the number of increments changes, the compression level to apply changes. Collectively, the initial compression level and first compression increment value can be referred to as compression parameters.

At 112, the image compression application applies compression using the compression level. The first time method 100 reaches operation 112, the compression level to apply is the initial compression level. When method 100 reaches operation 112 from operation 120, the increment value will be a non-zero number and a new compression level to apply can be determined using the above formula. Various conventional or novel image compression techniques can be used by the image compression application in various embodiments.

At 114, the image compression application determines the text contained in the compressed image resulting from operation 112. This can occur similarly to operation 106, including using OCR or other text recognition techniques, but applied to the compressed image instead of the original image. The determined contents can be saved, such as by storing the text in a variable named Text_compressed_to_"C" where C corresponds to the compression level applied in 112 or Text_iteration# where # is replaced with the iteration number increased by 1 each time compression is applied (or any other named variable or using any other means for saving text).

At 116, the image compression application compares the text contained in the compressed image as determined at 114 with the text contained in the original image as determined at 106. This can be done by comparing a text string saved to a variable such as Text_compressed_to_50 with a text string saved to a variable such as Text_original. In some embodiments, this comparison can result in a conclusion of identical or non-identical. In other embodiments, this comparison can also include a determination of how many differences between the texts are. For example, if the original text is "Highway 52 North," and the compressed image text is "Highway S2 N0rth," the image compression application can determine the text strings are not identical, and in some embodiments, determine there are 2 differences between the text strings (in this example the number "5" in the original was read as the letter "S" in the compressed image and the letter "o" was read as the number "0"). In embodiments which include a determination of how many differences between the texts are, the image compression application can use a threshold value of acceptable number of differences when comparing the texts (e.g., a threshold value of 1 can indicate that refinement is necessary only if 2 or more differences are present, but 1 difference is acceptable).

At 118, the image compression application determines whether refinement is needed using the first compression increment. This determination can vary in embodiments. In embodiments with a low initial compression level (resulting in a highly compressed image), refinement may be necessary when the text in the compressed image is not identical to the original image (or where there are an unacceptable number of differences). In some embodiments, a user may be able to specify that refinement is needed. In embodiments with a high initial compression level (resulting in an image without much compression), refinement may be necessary when the text in the compressed image is identical to the original image (or where the number of differences is not unacceptable). In such embodiments, the image compression application can continue to refine the compression level to a lower level (more compressed image) to save on space. Ultimately in such embodiments, refinement may proceed until the text in the compressed image is no longer identical to the original image (or where there are an unacceptable number of differences), and the image compression application can determine the last compression level where the text was identical (or before there are an unacceptable number of differences) is the desired compression level.

If the image compression application determines at 118 that refinement is needed, method 100 proceeds to 120 where the compression level is incremented by the first compression increment value. For example, if an initial compression level of 50 (on a scale from 0 to 100) was applied at 112, but resulted in a compressed image with text which was not identical to the original image and the first compression increment value is 10, then at 120, the compression level can be incremented to 60 before method 100 returns to 112 to apply the new compression level. This loop can continue until the image compression application uses a compression level which results in images with identical text (or with an acceptable amount of differences).

Once the image compression application determines at 118 that refinement is not needed (whether this occurs the first time method 100 reaches 118 or after some refinement has occurred), method 100 proceeds to 122. At 122, the image compression application finalizes the compressed image. This can vary in embodiments. In embodiments with a low initial compression level (e.g. more compression), the initial compression value may have resulted in non-identical text or an unacceptable number of differences. In such embodiments, subsequent iterations reduced the amount of compression in increments (e.g. increasing the number from 50 to 60 as opposed to decreasing from 50 to 40) until a compression level was reached which produced identical text to the original or an acceptable number of differences. In such embodiments, finalizing the compressed image comprises using the first good compression value. As used herein, a good compression value is a value which results in text identical to the original or an acceptable number of differences. In embodiments, this may involve either overwriting the original image or saving a copy of the compressed image resulting from the first good compression value.

In embodiments with a high initial compression level and where any refinement occurred by incrementing the compression level downwards until a compression level was reached where the text was no longer identical (or where an unacceptable number of differences was reached), finalizing the compressed image can include determining the last good compression value. The last good compression value can be the compression value used one iteration before text differences occurred or reached the unacceptable number. The compressed image which resulted from the last good compression value can be saved as the compressed image. In some embodiments, operation 122 can include further refinement of the compression level as discussed in regard to FIG. 2. After the compressed image is finalized at 122, method 100 ends at 124.

Figure 2:
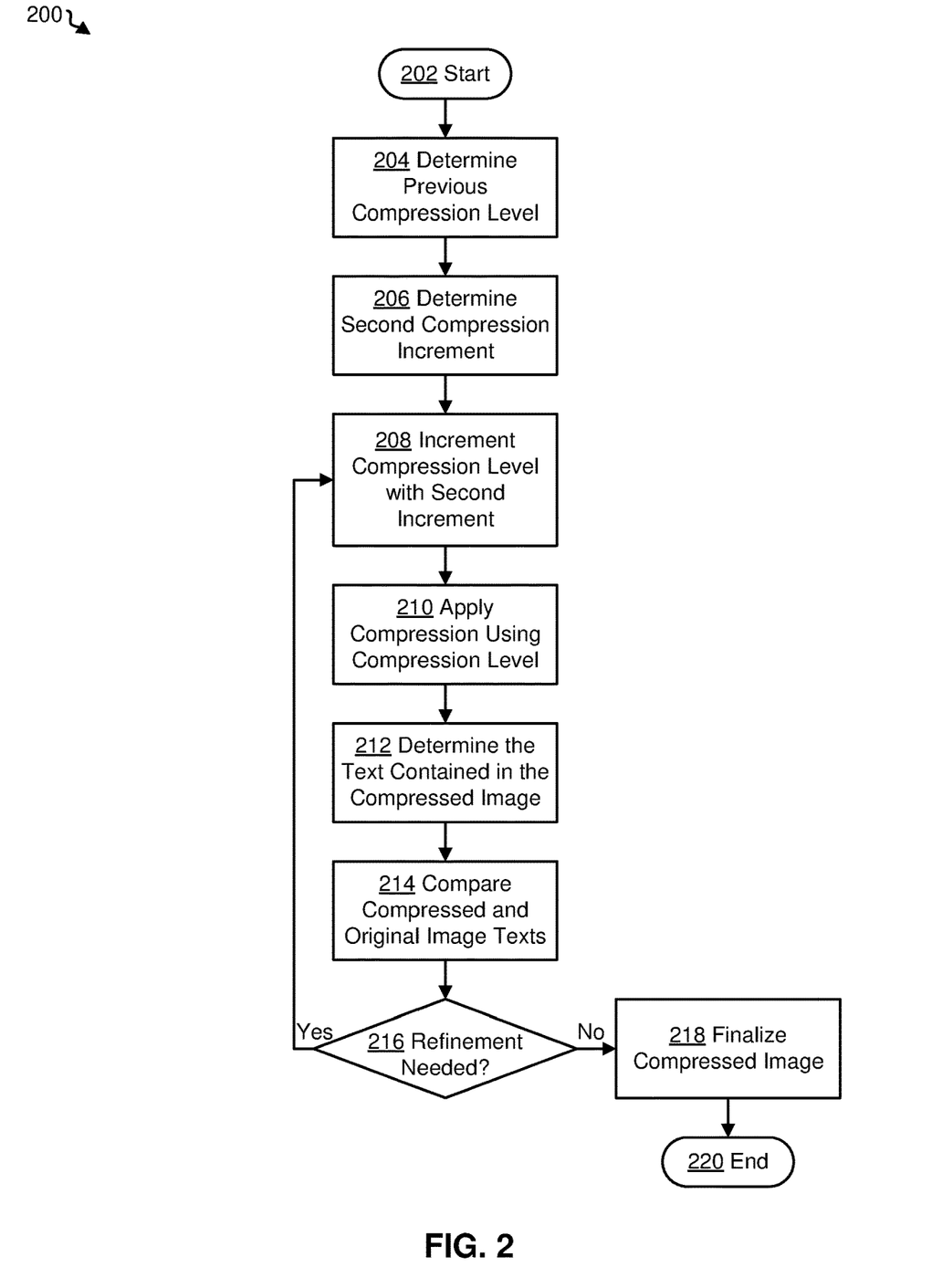
FIG. 2 depicts a sub-process of an example method for compressing a text-containing image while maintaining text readability, in accordance with embodiments of the present disclosure.

Referring now to FIG. 2, depicted is a sub-process 200 of an example method for compressing a text-containing image while maintaining text readability, in accordance with embodiments of the present disclosure. Sub-process 200 can include more or fewer actions than those depicted. Sub-process 200 can include actions in different orders than those depicted. In some embodiments, sub-process 200 can be performed using a user device (such as user device 300 depicted in FIG. 3) running an image compression application. In some embodiments, sub-process 200 can be performed by one or more devices operated by an image compression service using an image compression application, including by devices utilizing cloud computing technology (such as depicted in FIGS. 4 and 5). In some embodiments sub-process 200 can be implemented using hardware devices instead of an application. In the following discussion, sub-process 200 will be described as being performed by an image compression application, but the present disclosure is not limited to such. In some embodiments, sub-process 200 can be part of or can replace operation 122 of method 100.

From start 202, an image compression application can determine the previous compression level of an image at 204. When sub-process 200 occurs as part of operation 122 of method 100, this will occur after the image compression application has applied one or more compression levels to an image and determined at 118 that refinement using the first compression increment is not needed. At 204, the image compression application can determine the compression level which was attempted by the image compression application before the level which resulted in the determination at 118. For example, the image compression application attempted compression of an image at initial compression level 50, determined there were differences between the text of the original and compressed images, attempted compression at level 60, and then again at level 70 at which point the text was the same and further refinement using the first compression increment was determined not needed. In this example, the previous compression level would be 60 because it was the last compression level using the first compression increment at which it was determined that refinement was still needed.

At 206, the image compression application determines a second compression increment value. The second compression increment value should be smaller than the first compression increment value, but may otherwise be determined similarly to the first compression increment value, discussed above regarding operation 110 of FIG. 1. Continuing with the previous example, the first compression increment was 10 (resulting in compression levels of 60 and 70 after 50), and the image compression application can determine a second compression increment value to be 2 based on user input or determination of available computing resources.

At 208, the image compression application increments the previous compression level with the second compression increment value. This can occur similarly to that discussed above regarding operation 120 of FIG. 1. Continuing the example, the previous compression level of 60 can be incremented to 62.

At 210, the image compression application applies compression using the compression level. This can occur similarly to that discussed above regarding operation 112 of FIG. 1.

At 212, the image compression application determines the text contained in the compressed image. This can occur similarly to that discussed above regarding operation 114 of FIG. 1.

At 214, the image compression application compares the text determined in the compressed image and original image. This can occur similarly to that discussed above regarding operation 116 of FIG. 1.

At 216, the image compression application determines whether refinement is needed using the second compression increment value. This can occur similarly to that discussed above regarding operation 118 of FIG. 1. By incrementing iteratively again using the (smaller) second compression increment value, the image compression application can ultimately reach a more precise compression level than possible using only the larger first compression increment. Continuing with the example, method 200 may determine that refinement is no longer needed once a compression level of 64 is reached, which allows for further compression than the determined compression level of 70 using the example larger first compression increment of 10. Further iterations using a third or subsequent smaller compression increment are also possible.

Once it is determined that refinement is not necessary using the second compression increment value, the compressed image can be finalized at 218, which can include saving the image at the appropriate compression level, similarly to that disused above regarding operation 122 of FIG. 1. After finalizing the compressed image at 218, sub-process 200 ends at 220.

Figure 3:
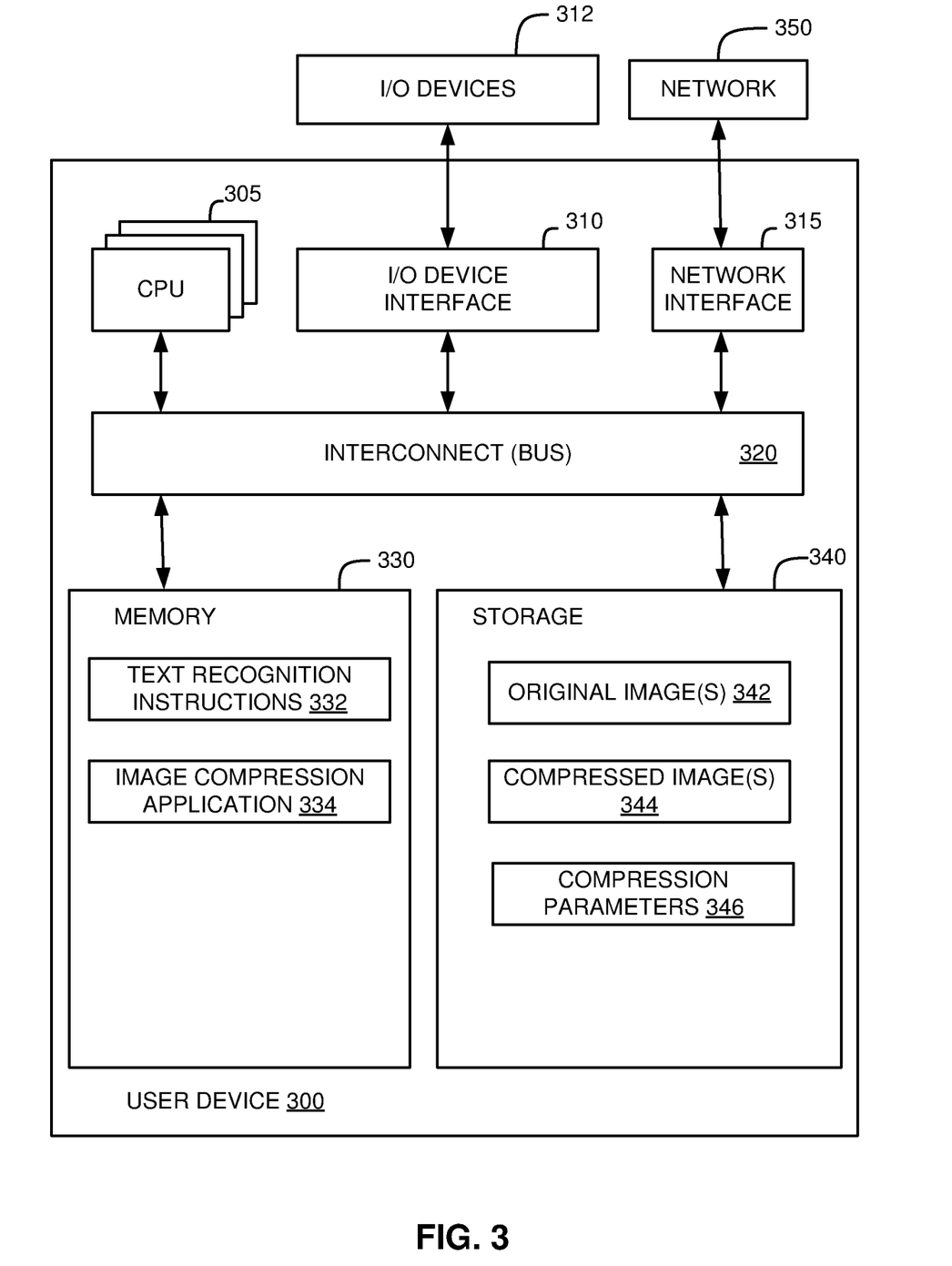
FIG. 3 illustrates a block diagram of a user device, in accordance with some embodiments of the present disclosure.

Referring now to FIG. 3, illustrated is a block diagram of a user device 300, in accordance with some embodiments of the present disclosure. In some embodiments, user device 300 performs operations in accordance with FIGS. 1 and/or 2 as described above. The user device 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340.

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash).

In some embodiments, the memory 330 can be in the form of modules (e.g., dual in-line memory modules). The storage 340 is generally included to be representative of a non-volatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the user device 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of user device 300 includes text recognition instructions 332 and image compression application 334. Text recognition instructions 332 are instructions for extracting text from images which contain text and saving the extracted text as a variable, in a text file, or otherwise saving the text. Text recognition instructions 332 can be a conventional text recognition program or instructions, such as an optical character recognition program or instructions. Text recognition instructions 332 can include instructions for recognizing alphanumeric characters, symbols, emoticons, emojis, or any similar symbols.

Image compression application 334 can be an application which performs method 100 of FIG. 1 and/or sub-process 200 of FIG. 2. Image compression application 334 can include instructions for iteratively attempting image compression and comparing the text contained in a compressed image with the text contained in an original image to achieve a compressed image which contains the same text as the original image. Image compression application 334 can include instructions for performing the image compression and/or instructions for accessing or implementing instructions which can do so.

Storage 340 contains original image(s) 342, compressed image(s) 344, and compression parameters 346. Original image(s) 342 can be images containing text, input to an image compression application by a user for compression.

Compressed image(s) 344 can be images obtained by using image compression application 334 on one or more of original image(s) 342, such as in accordance with method 100 of FIG. 1 and in some cases sub-process 200 of FIG. 2. One or more compressed image 344 can exist for each original image such as a compressed image obtained at an initial compression level and one or more compressed images obtained at incremented compression levels.

Compression parameters 346 can be parameters used by image compression application 334. Compression parameters 346 can include an initial compression level, which can be a compression level within a range of possible compression levels used by image compression application 334 (such as, but not limited to, initial compression level 45 within a range of 0 to 100). Compression parameters 346 can include one or more compression increment values for incrementing compression levels to iteratively apply higher or lower compression levels to an image.

In some embodiments as discussed above, the memory 330 stores text recognition instructions 332 and image compression application 334, and the storage 340 stores original image(s) 342, compressed image(s) 344, and compression parameters 346. However, in various embodiments, each of the text recognition instructions 332, image compression application 334, original image(s) 342, compressed image(s) 344, and compression parameters 346 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with user device 300.

The network 350 can connect (via a physical or wireless connection) the user device 300 with other networks, and/or one or more devices that interact with the user device.

Logic modules throughout the user device 300—including but not limited to the memory 330, the CPUs 305, and the I/O device interface 310—can communicate failures and changes to one or more components to a hypervisor or operating system (not depicted). The hypervisor or the operating system can allocate the various resources available in the user device 300 and track the location of data in memory 330 and of processes assigned to various CPUs 305. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image compression 96. Image compression 96 can be a workload or function such as that described in FIGS. 1 and 2 above.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for compressing a text-containing image while maintaining text readability, the method comprising:
   receiving an original image containing a string of text;
   determining the string of text contained in the original image using text recognition;
   applying a first compression level to the original image to create a first compressed image;
   determining a string of text contained in the first compressed image using text recognition;
   comparing the string of text contained in the original image with the string of text contained in the first compressed image;
   based on results of the comparison of the string of text contained in the original image with the string of text contained in the first compressed image, incrementing the first compression level using a first compression increment value to reach a second compression level;
   applying the second compression level to the original image to create a second compressed image;
   determining a string of text contained in the second compressed image using text recognition;
   comparing the string of text contained in the original image with the string of text contained in the second compressed image;
   based on results of the comparison of the string of text contained in the original image with the string of text contained in the second compressed image, determining further image compression refinement using the first compression increment value is unnecessary;
   determining a second compression increment value;
   incrementing the second compression level using the second compression increment value to reach a third compression level;
   applying the third compression level to the original image to create a third compressed image;
   determining the string of text contained in the third compressed image using text recognition; and
   comparing the string of text contained in the original image with the string of text contained in the third compressed image.

2. The method of claim 1, wherein the string of text is comprised of characters selected from the group consisting of alphanumeric characters, symbols, emoticons, and emojis.

3. The method of claim 1, wherein the first compression level is an initial compression level selected dynamically based on the resolution of the original image.

4. The method of claim 1, wherein the first compression increment value is selected dynamically based on an amount of available computing resources.

5. The method of claim 1, wherein determining further image compression refinement using the first compression increment value is unnecessary further comprises:
   determining a number of differences between the string of text contained in the original image and the string of text contained in the second compressed image; and
   comparing the number of differences with a threshold number.

6. The method of claim 1, wherein the text recognition comprises optical character recognition (OCR).

7. A system for compressing a text-containing image while maintaining text readability, the system comprising:
   one or more processors; and
   a memory communicatively coupled to the one or more processors,
   wherein the memory comprises instructions which, when executed by the one or more processors, cause the one or more processors to perform a method comprising:
   receiving an original image containing a string of text;
   determining the string of text contained in the original image using text recognition;
   applying a first compression level to the original image to create a first compressed image;
   determining a string of text contained in the first compressed image using text recognition;
   comparing the string of text contained in the original image with the string of text contained in the first compressed image;
   based on results of the comparison of the string of text contained in the original image with the string of text contained in the first compressed image, incrementing the first compression level using a first compression increment value to reach a second compression level;
   applying the second compression level to the original image to create a second compressed image;
   determining a string of text contained in the second compressed image using text recognition;
   comparing the string of text contained in the original image with the string of text contained in the second compressed image;
   based on results of the comparison of the string of text contained in the original image with the string of text contained in the second compressed image, determining further image compression refinement using the first compression increment value is unnecessary;
   determining a second compression increment value;
   incrementing the second compression level using the second compression increment value to reach a third compression level;
   applying the third compression level to the original image to create a third compressed image;
   determining the string of text contained in the third compressed image using text recognition; and
   comparing the string of text contained in the original image with the string of text contained in the third compressed image.

8. The system of claim 7, wherein the string of text is comprised of characters selected from the group consisting of alphanumeric characters, symbols, emoticons, and emojis.

9. The system of claim 7, wherein the first compression level is an initial compression level selected dynamically based on the resolution of the original image.

10. The system of claim 7, wherein the first compression increment value is selected dynamically based on an amount of available computing resources.

11. The system of claim 7, wherein determining further image compression refinement using the first compression increment value is unnecessary further comprises:
   determining a number of differences between the string of text contained in the original image and the string of text contained in the second compressed image; and
   comparing the number of differences with a threshold number.

12. The system of claim 7, wherein the text recognition comprises optical character recognition (OCR).

13. A computer program product for compressing a text-containing image while maintaining text readability, the computer program product comprising a computer readable storage medium having program instructions embodied therewith, wherein the computer readable storage medium is not a transitory signal per se, the program instructions executable by a computer to perform a method comprising:
   receiving an original image containing a string of text;
   determining the string of text contained in the original image using text recognition;
   applying a first compression level to the original image to create a first compressed image;
   determining a string of text contained in the first compressed image using text recognition;
   comparing the string of text contained in the original image with the string of text contained in the first compressed image;
   based on results of the comparison of the string of text contained in the original image with the string of text contained in the first compressed image, incrementing the first compression level using a first compression increment value to reach a second compression level;
   applying the second compression level to the original image to create a second compressed image;
   determining a string of text contained in the second compressed image using text recognition;
   comparing the string of text contained in the original image with the string of text contained in the second compressed image;
   based on results of the comparison of the string of text contained in the original image with the string of text contained in the second compressed image, determining further image compression refinement using the first compression increment value is unnecessary;
   determining a second compression increment value;
   incrementing the second compression level using the second compression increment value to reach a third compression level;
   applying the third compression level to the original image to create a third compressed image;
   determining the string of text contained in the third compressed image using text recognition; and
   comparing the string of text contained in the original image with the string of text contained in the third compressed image.

14. The computer program product of claim 13, wherein the string of text is comprised of characters selected from the group consisting of alphanumeric characters, symbols, emoticons, and emojis.

15. The computer program product of claim 13, wherein the first compression level is an initial compression level selected dynamically based on the resolution of the original image.

16. The computer program product of claim 13, wherein the first compression increment value is selected dynamically based on an amount of available computing resources.

17. The computer program product of claim 13, wherein determining further image compression refinement using the first compression increment value is unnecessary further comprises:
   determining a number of differences between the string of text contained in the original image and the string of text contained in the second compressed image; and
   comparing the number of differences with a threshold number.

* * * * *